Figure 1A:
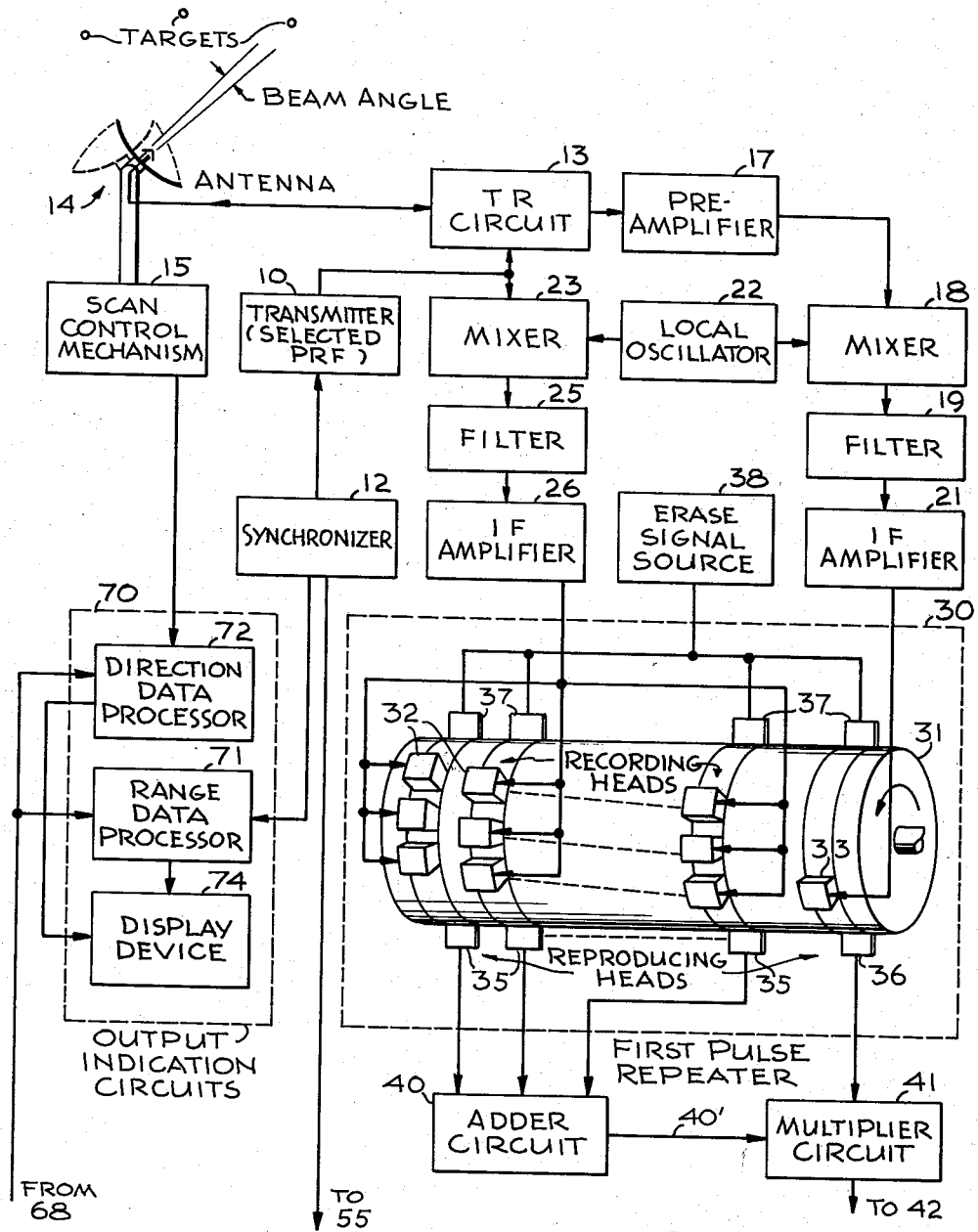

RICHARD D. YOUNG
MELVIN J. SARGEANT
INVENTORS

BY FRASER AND BOGUCKI
ATTORNEYS

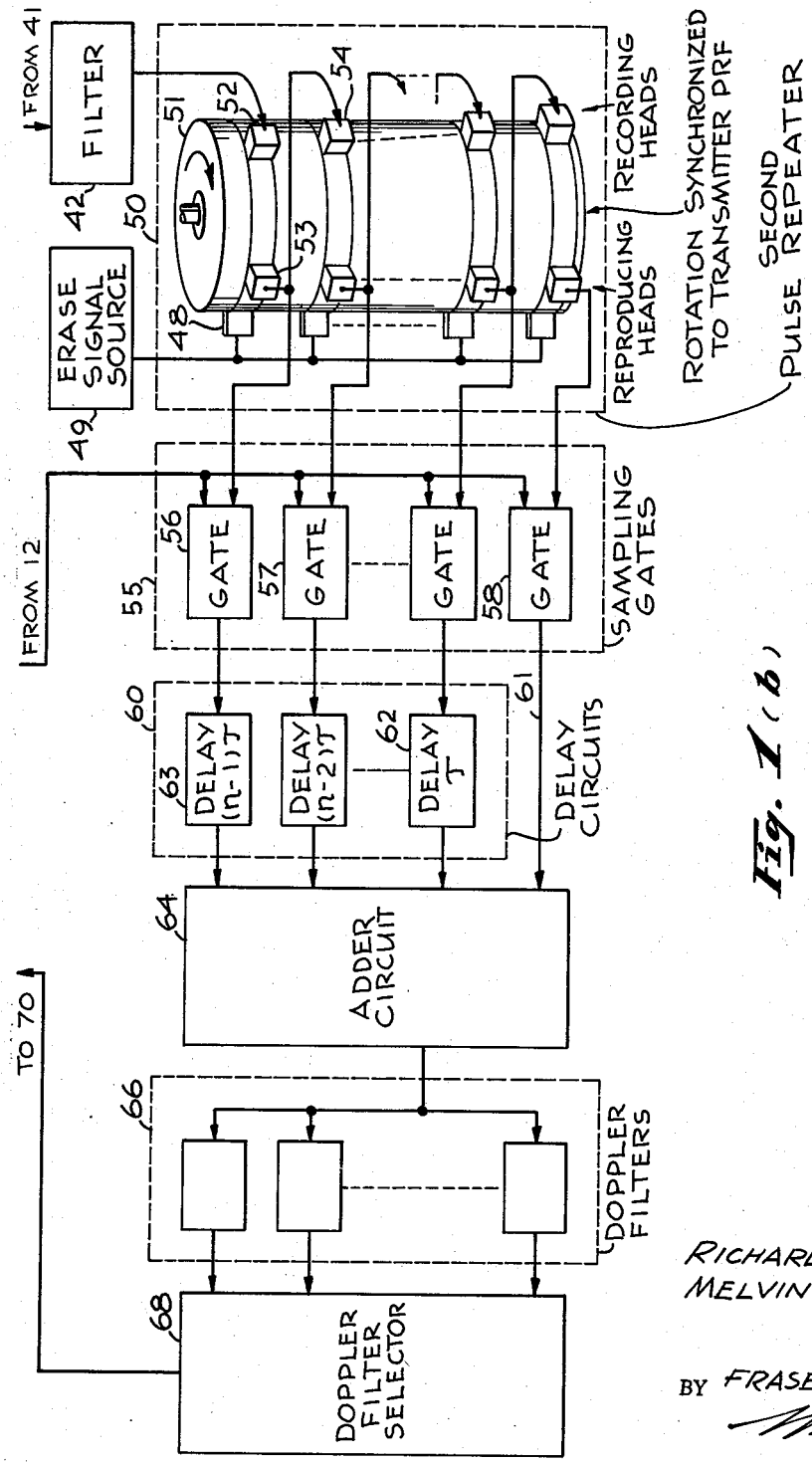

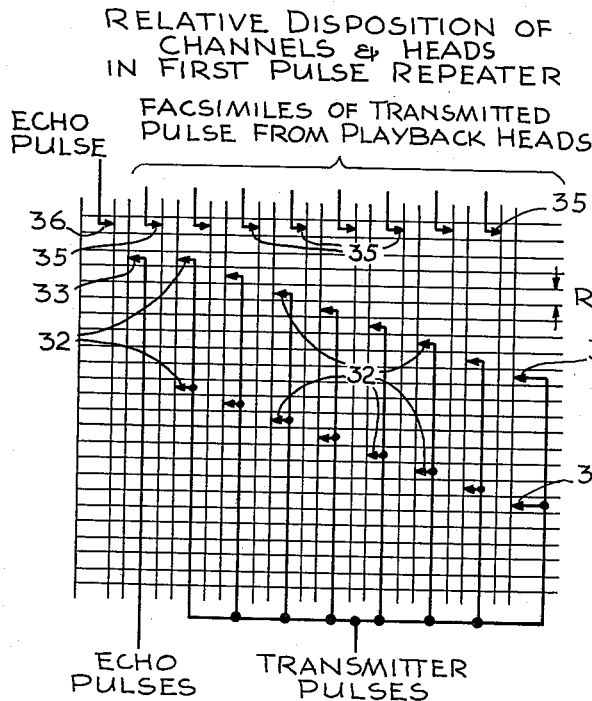
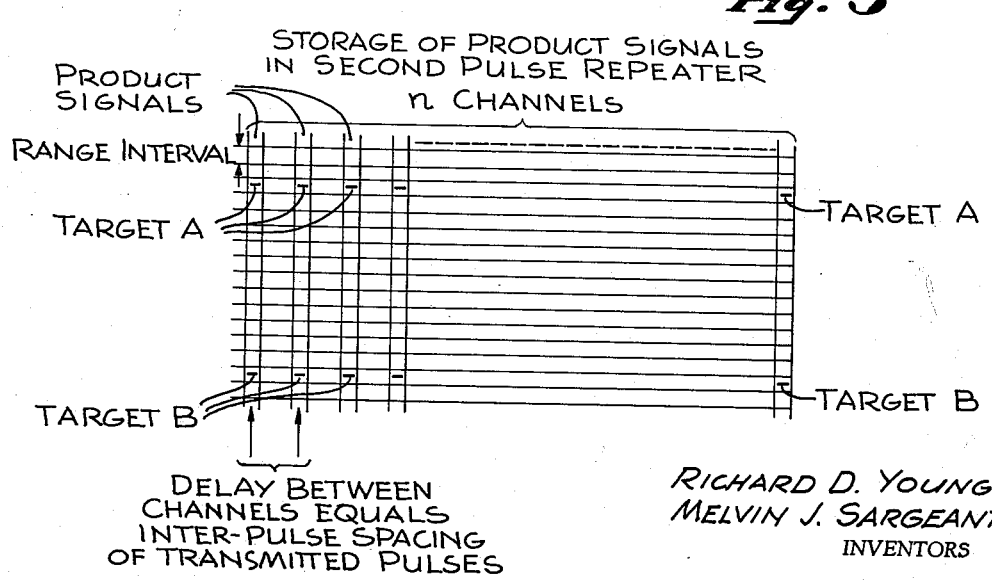

May 12, 1964   R. D. YOUNG ETAL   3,133,281
DETECTION AND RANGING SYSTEMS
Filed May 16, 1960   4 Sheets-Sheet 4
Fig. 4
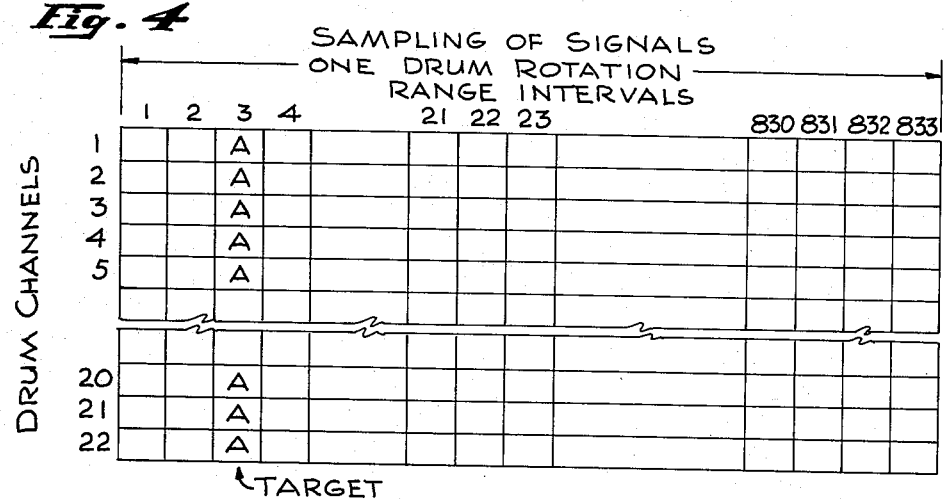
Fig. 5
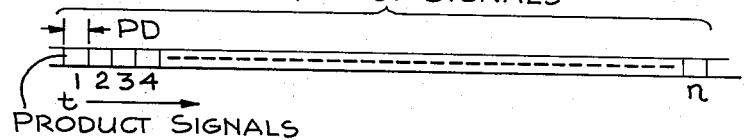
Fig 6 (A)     Fig. 6 (B)
FREQUENCY COMPRESSION BY SAMPLING
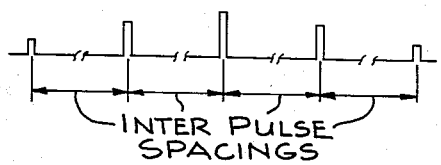   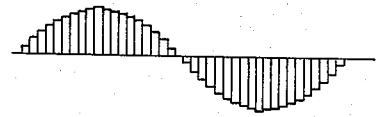
RICHARD D. YOUNG
MELVIN J. SARGEANT
INVENTORS
BY FRASER AND BOGUCKI
ATTORNEYS

United States Patent Office 3,133,281
Patented May 12, 1964

3,133,281
DETECTION AND RANGING SYSTEMS
Richard D. Young, Woodland Hills, and Melvin J. Sargeant, Malibu, Calif., assignors to Thompson Ramo Wooldridge Inc., Canoga Park, Calif., a corporation of Ohio
Filed May 16, 1960, Ser. No. 29,544
17 Claims. (Cl. 343—11)

This invention relates to pulse echo type radar systems for improving detection capability against targets in the presence of random noise or interfering signals and more particularly to search radars for determining direction and range of a multiplicity of distant reflecting objects at long range. The invention also relates to systems for converting serial, periodically derived information into other forms in which the information may be more readily processed.

The usual pulse echo type detection system is often required to operate under conditions in which high levels of random noise are present, or against targets which are themselves generating noise which is in many respects, but not necessarily, equivalent to echoes. The echo signals from the target may be lost in a maze of interfering signals. Even when interfering signals of these types are not present, the range of a pulse echo system may be limited by external factors, such as clouds, rain or thermal discontinuities, or by internal factors, such as antenna efficiency or receiver noise.

To overcome some of the above difficulties, past radar systems have employed, among other things, phase coherent transmitted frequencies. By maintaining the transmitter frequencies stable, echo signals may be compared to the transmitted signals so as to permit the echo signals to be much more readily distinguished. Many of the radar systems which are presently in operation, however, utilize magnetron and other types of oscillators whose frequencies drift several thousand cycles per second during the interpulse period between transmitted pulses. With such random frequency variations in the oscillator which generates the transmitted pulses, it is not feasible to compare the phase of the echo signals against the transmitted signals because of the loss of phase coherence. Many and extensive changes to the system would be needed to establish phase coherent operation. It is highly desirable, therefore, to provide a means which will greatly augment the capabilities of these existing systems for detecting targets at longer ranges and against higher levels of obscuring signals than has heretofore been possible.

It is particularly desirable to provide these added capabilities in a search type of radar, in which the ability of the radar to distinguish a great many targets at extremely long range is a prime requisite. Where more than one target lies substantially along the same line of direction from the radar, for example, the system should be able to separate the different targets and should be capable of providing equally accurate information about each of the targets.

The search radar system is but one illustration of the modern electronic information handling system in which signals are derived by the system at periodic intervals from multiple individual sources. It is usually desirable to convert such signals to a different form, so that all signals from each source are effectively together. Such a result is not conveniently achieved by expedients heretofore available, however, particularly where the signals from the different sources do not occur in fixed time relation to each other.

Systems in accordance with the present invention provide these desirable features by augmenting the capability of existing pulse echo type radar systems in a manner to provide signal-to-noise ratio capability which is substantially equivalent to phase coherent operation. Facsimiles of each transmitted pulse are reproduced in a timed sequence, so that received echo pulses may be compared to the facsimiles. The results of these comparisons for the echo pulses received from the same target in response to successive transmitted pulses are subsequently arranged in a serial but time-compressed relationship, and contain frequency components which may be detected and employed to ascertain the presence, direction, and range of the target.

A preferred form of the invention operates with a pulse echo type radar and utilizes transmitted pulses of fixed duration and fixed pulse repetition frequency together with the echo pulses returned from moving or stationary targets. Each transmitted pulse is applied to a first pulse repeater to develop a continuous signal train consisting of time contiguous facsimiles of the transmitted pulse. The continuous signal train derived from the transmitted pulse is multiplied against the received signal train containing the echo pulses to provide pulse-like product signals which are, for practical purposes, of the same duration as individual echo pulses. Each pulse-like product signal, or simply "product pulse," has an effective amplitude or energy content, determined by the magnitude of phase shift introduced between the transmitted pulse and echo pulse producing a given pulse product signal. The magnitude of such a phase shift is determined by the magnitude of the distance between the transmitter and a given target. The magnitude of this phase shift will vary from one echo pulse to the next from the same target if the target is moving so as to change the magnitude of the distance, or range, between the target and the radar system. The product signals then are applied to a second pulse repeating device which selects, stores, and reproduces the product signals in a rearranged form. Product signals which correspond to echoes derived from the targets at a given range in response to a given number of successive transmitted pulses are grouped together in the second pulse repeater. The product signals in the individual groupings are reproduced concurrently, but the groupings are reproduced at different times during each interpulse period. The time of reproduction of each grouping of product signals is dependent upon the range interval to the target or targets giving rise to the corresponding echo pulses. The simultaneously reproduced product signals are gated out at different times relative to the interpulse period and are then shifted into a serially time displaced signal train which contains frequency components determined by the phase shifts introduced by the moving target. Frequency sensitive means are employed to sense the occurrence of these frequency components, thus to establish detection of the target.

In accordance with a preferred form of the present invention, the simultaneously reproduced pulses from the second pulse repeating device are subsequently individually delayed by incrementally varying amounts which are selected in accordance with the transmitted pulse duration and the number of echo pulses expected from each target during a scan. Time compression is achieved by reproducing successive product signals without an interpulse spacing.

An aspect of the invention is that the simultaneously reproduced pulses from the second pulse repeating device are gated out in such fashion that there is no overlapping when the subsequent serial pulse trains are formed. The signals from the second pulse repeating device are sampled at separated intervals in a fashion such that no information is lost.

Another aspect of the invention is that there is provided as relatively simple but highly effective system for converting serially provided signals to other forms. By successively shifting related signals into a time parallel disposition, and subsequently inserting a selected time displacement between the signals, signals periodically derived from a single source, but interleaved with other signals, may be derived in a form suitable for ready processing.

The novel features of the invention may be better understood by reference to the following description, taken in conjunction with the accompanying drawings, in which like reference numerals refer to like parts, and in which:

FIGURE 1 is a block diagram representation of the principal elements of a system in accordance with the invention; and FIGS. 2 to 6, inclusive, are simplified representations of various relationships observed in the operation of the arrangement of FIG. 1 which are useful in describing the arrangement and functioning of the system.

Referring now to FIG. 1, there are shown the principal elements of a pulse echo type radar of the type having high capability for the detection and arranging of a large number of distant targets. The radar includes a transmitter 10 which transmits high power pulses with a known fixed pulse repetition frequency (PRF). A synchronizer 12 is coupled to the transmitter 10 for operating, in well known fashion, to provide control of the pulse repetition frequency and the pulse duration and to provide timing measurement of the received signals. The pulses to be transmitted are directed from the transmitter 10 through a transmit-receive (hereinafter T-R) circuit 13 which is coupled to an antenna 14. The antenna 14 is of the movable scan type and is illustrated as employing a paraboloid reflector although, as will be made apparent below, other types of antennas and radiation transducers may be employed depending upon the type of system and the frequency range which is to be utilized. Here the antenna 14 is moved in a predetermined cyclic pattern by a scan control mechanism 15 so as to direct a relatively narrow scanning beam through the volume in space which is to be searched.

The advantages of systems embodying the present invention are perhaps most clearly apparent when applied to the complex problems of search radar. It is desired to determine the direction and range of individual ones of a great many different targets, each of which may return echoes which are obscured by high ambient, or deliberately created, noise levels. For the purpose of providing a specific example, it is assumed that the search radar operates at a frequency of 1200 megacycles (mc.) with 3 microsecond pulses at a 400 pulse per second repetition frequency. A 400 pulse per second repetition frequency provides a 2500 microsecond interpulse interval. The radar scan speed is chosen, for this example, so that with an antenna beam width of 2° approximately 22 echoes will be returned from each target during each radar scan.

As is well known, the T-R circuit 13 operates to divert the high power transmitter pulses from the transmitter 10 to the antenna 14, while effectively isolating the transmitter pulses from the relatively sensitive receiver circuitry. Conversely, the relatively low power received pulses are automatically transferred by the T-R circuit 13 to the further processing equipment which is here employed. The signal processing equipment is employed in conjunction with the transmitter 10 and other elements of the radar to form what may be called a signal analyzing system.

For improved amplification and recording of the returned echo signals, they are amplified once, heterodyned to a lower, intermediate frequency, and then amplified again at the intermediate frequency. To this end, the pulse modulated oscillatory waves, which are derived as echoes, are first applied to a preamplifier 17, and as thus amplified are applied to a series combination of a mixer circuit 18, filter 19, and IF amplifier 21. A local oscillator 22 is also coupled to the mixer 18 and provides a frequency reference signal for heterodyning against the signal which is provided from the preamplifier 17. By way of example, the frequency of the local oscillator may be 1199 mc., so that with a nominal frequency of 1200 mc. for the received signals, the output signal derived from the mixer 18 is approximately 1.0 mc. Such a frequency may readily be stored with modern recording techniques on a magnetic medium. The filter 19 is a bandpass filter selected to accept the approximately 1.0 mc. difference frequency which is provided from the mixer and to reject the applied input signal frequencies, as well as the higher order harmonics of the difference frequency.

A representation of the transmitted pulses is derived through a coupling of the transmitter 10 to a second mixer 23 which is also coupled to the local oscillator 22. Again, pulse modulated oscillatory waves (here the transmitted pulses) are applied to one input terminal of the mixer 23 and are heterodyned against the selected frequency provided by the local oscillator 22 to provide an approximately 1.0 mc. output signal. A filter 25 is employed to reject frequency components other than those in a relatively narrow band encompassing the difference frequency provided by the mixer 23, and an IF amplifier 26 provides signals of suitable amplitude for further processing.

A first pulse repeater 30 coupled to the IF-amplifiers 21 and 26 consists principally of a magnetic drum 31 rotating at a substantially constant speed and driven by an external source (not shown). Employed with the drum 31 are a number of magnetic recording heads 32 for recording facsimiles of the transmitted pulses on the drum 31, and a single magnetic recording head 33 for recording representations of the received echo pulses. The heads 32 for recording facsimiles of the transmitted pulses are, by way of example, disposed in separate channels along the length of the drum and in selected, staggered, circumferential positions with respect to each other. Each of the heads 32 is coupled to receive signals from the IF amplifier 26. The head 33 for recording representations of the echo pulses is operatively associated with a different channel on the drum 31 and is coupled to receive signals from the IF amplifier 21. Separate reproducing heads 35 are associated with each of the different ones of the channels in which the facsimiles of the transmitted pulses are recorded, and these reproducing heads 35 have like circumferential positions with respect to the drum 31, so that, in the example illustrated, they lie in a line parallel to the central axis of the drum 31. A separate reproducing head 36 is positioned to reproduce signals recorded in the channel containing the representations of the echo pulses, and this head 36 for convenience may be placed in line with the other reproducing heads 35. Associated with all of the reproducing heads 35 and 36 are erase heads 37, coupled to an erase signal source 38, which remove the recorded pulse data in order to clear the drum 31 for recording the next transmitted pulse and echo pulses.

The arrangement of the first pulse repeater 30 is such that a facsimile of the transmitted pulse is provided for each range interval which is of interest, during an interpulse period. A range interval (or range bin) is to be considered as the smallest non-ambiguous time interval in which an echo may be distinguished. With the given condition there are approximately 833 range intervals of interest, because a 3 microsecond echo can be provided during any of the intervals of the 2500 microsecond interpulse interval. There are therefore approximately 833 range intervals, or range bins, which must be examined or sampled to determine in which segment of an interpulse period an echo is provided. This number therefore also approximates the maximum number of separate echoes from a like number of spaced targets which may be nonambiguously detected, although it will of course be recognized that no such numbers of echoes or targets will be generally encountered under normal conditions, and that extremely close and extremely far out objects may provide echoes, but that these are not of practical interest.

The distribution of the recording heads 32 of FIG. 1 relative to the different channels and circumferential dispositions about the channels may be better explained with relation to FIG. 2. As shown, each of the channels is, in simplified form, represented by a vertical column defined by a pair of spaced lines, with a separation between the columns. The range intervals are defined as separate horizontal rows which are adjacent to each other. The reproducing heads 35 for the facsimiles of the transmitted pulses and reproducing head 36 for the representations of the echo pulses are all disposed in the same row. The succeeding rows are each of sufficient circumferential length along the channels to correspond to the lengths of the recorded pattern of the facsimile of a transmitted pulse. Thus they may be regarded as representing the range intervals in length along the channels. To record facsimiles of the transmitted pulses in each range interval of interest, the reproducing heads 32 are disposed in spaced relation with respect to individual channels, and in staggered relation along the different individual channels. Each of the reproducing heads 32 is therefore associated with a different range interval from each of the others. This arrangement affords sufficient room for the convenient placement and positioning of each of the recording heads 32, even though many heads may have to be accommodated.

The spacings along the channels between the reproducing heads 35 and the different ones of the recording heads 32 provide different amounts of delay in the pulses recorded in the different channels. The delays are such that, following the recording of the transmitted pulses in all of the different range intervals in the respective channels, and following a delay sufficient for the first of these recorded patterns to reach its associated reproducing head 35, a facsimile of the transmitted pulse is reproduced for each range interval of interest. The spacing along the channel between reproducing head 36 and recording head 33 is set to provide an amount of delay equal to the smallest amount of delay introduced between reproducing heads 35 and recording heads 32. At some random time or times within the interpulse period, a representation of an echo pulse is recorded and read out by the associated reproducing head 36 at a time falling within some interval. It will be recognized that this function of providing a continuous sequence of facsimiles of the transmitted pulse to last over the interpulse interval may also be provided by recirculating delay lines which are adjusted to correspond to the range interval, or by different arrangements on magnetic drums.

The facsimiles of the transmitted pulse which are reproduced by the reproducing heads 35 are applied in parallel to an adder circuit 40, which effectively converts the signals from parallel channels to a time contiguous serial train of transmitted pulse facsimiles appearing on the single output terminal 40′ of the adder circuit 40. These signals constitute the desired essentially continuous sequence of contiguous facsimiles of the transmitted pulse and occur substantially over the entire interpulse period. The continuous train of signals from the adder circuit 40 is provided along with the reproduced representations of the echo pulses from the reproducing head 36 to a multiplier circuit 41. The multiplier circuit 41 is preferably a balanced multiplier, so that it provides an output signal only when input signals are present on both its input terminals.

The multiplier 41 output signals are therefore product pulses each of which is dependent in amplitude upon the phase relation of the particular facsimile of the transmitted pulse and the particular echo pulse that produced it. The phase shift is that introduced because of the time it takes a transmitted pulse to reach the target and return to the radar system and hence is of a magnitude which is a function of the distance between the radar system and the distant reflecting target. This phase shift between facsimiles of the transmitted pulse and echo pulses from the same distant target, and hence the amplitude of the product pulse output signal from multiplier 41, will vary from one interpulse interval to the next if the distant target is moving such that its distance relative to the transmitter 10 changes. As described in more detail hereinafter, the amplitude variations in those product pulses corresponding to a given moving target of this type will define a difference frequency (due to well known Doppler frequency shift effect) which may be later employed in the development of useful direction and range information. A bandpass filter 42 is coupled to the output terminal of the multiplier circuit 41 so as to pass only those signals whose frequencies fall within the range of frequencies encompassing both frequencies necessary to maintain the shape of the individual pulses from the multiplier circuit 41 and those desired for frequency analysis.

A second pulse repeater 50 is employed to effectuate the frequency analysis to be described. The second pulse repeater 50 includes a magnetic drum 51 driven at a selected rotational speed by a suitable source (not shown). Again, a number of separate recording channels are employed on the magnetic drum 51. In each channel there is positioned at least one recording head, and associated with each recording head one reproducing head spaced apart from its associated recording head and a following erase head. The spacing between the recording head and the reproducing head in the same channel is selected with relation to the speed of rotation of the drum 51, such that the signal recorded by the recording head is reproduced precisely one interpulse period later by the reproducing head. Further, the reproducing head is coupled to the recording head of the next succeeding channel, and a total number of channels is used which corresponds to the number (n) of echo pulses which are expected to be returned from a given target during a radar scan. Here, n equals 22, so that 22 thus intercoupled channels are disposed on the drum 51. By way of specific example, in the first channel, to which signals passed by the filter 42 are applied, there is a recording head 52 and a spaced apart reproducing head 53, followed by an erase head 48 coupled to an erase signal source 49. The reproducing head 53 in the first channel provides an output signal which is coupled to a recording head 54 for recording the same signals in the next succeeding channel at a circumferential position which is aligned with the first recording head 52.

Because of this relationship of the recording, reproducing, and erase heads, a signal generated in the multiplier circuit 41 and passed by the filter 42 is recorded in the first channel of the second pulse repeater 50, and then, one interpulse period later, is recorded in a corresponding position in the next adjacent channel, and so on until recording has been completed in each of the channels. Actually, this constitutes a shifting of the signals from one channel to the next succeeding channel, for as a recorded signal in the first channel is reproduced and virtually simultaneously recorded in the second channel, the output signals provided from the multiplier circuit 41 and filter 42 record a new signal in the first channel. Because of the relationship of the recording to the interpulse period, however, this new signal is the next echo signal derived from the same target. The number of channels, n, is sufficient to place in a space and time parallel relationship all of the echoes expected to be derived from a given target during a radar scan. Amplifier circuits may be employed in the separate intercouplings where desired, and have been omitted in order to simplify the drawings.

In the presence of certain targets, the product signals which are momentarily recorded in the various channels of the second pulse repeater 50 may be disposed on the drum 51 in a manner represented graphically in FIG. 3. Therein, the different range intervals extending circumferentially around the drum are shown as horizontal rows, while the different channels are shown as vertical columns. For a given radar scan, it is assumed that there are two targets, target A and target B, disposed at different distances but lying in the same direction from the system. The representation of FIG. 3 shows the relative positions of the 22 product signal representations provided from each of target A and target B at the instant in which the radar beam has passed the direction in which the targets lie. The 22 product signals generated as a result of the reception of echo pulses derived from target A are disposed in a given range interval row on the drum. A like number of product signal reproductions are disposed in a different range interval row on the drum to represent target B.

Essentially, this arrangement places the serial but alternately received echo pulse representations derived from the two targets, and recorded in the form of product signals, into parallel and separated dispositions within the second pulse repeater 50. It will be recognized that other forms of recirculating devices may be employed to store and shift the product signal representations of the different echo pulses, but it is preferred to employ the present arrangement for simplicity and compactness. Alternatively, for example, a series of delay lines may be employed, each of which provides a delay equal to an interpulse period.

The signals provided in parallel from the second pulse repeater 50 are again converted to a serial train of pulses, but in this serial train there is a time compression by elimination of the interpulse spacing. The signals are applied to a group of sampling gates 55 consisting of n coincidence gates, each of which is coupled to receive a signal from a different channel in the second pulse repeater 50. Thus, a first gate 56 is coupled to the reproducing head 53 of the first channel of the second pulse repeater 50, a second gate 57 is coupled to the reproducing head of the second channel, and an n gate 58 is coupled to the nth channel reproducing head of the second pulse repeater 50. Each of the gates 56, 57, etc., is conditioned to pass signals therethrough upon coincident application of gating pulses from the synchronizer 12.

These gating pulses are provided in a specific time relationship to the pulse repetition frequency and to the rotation rate of the second pulse repeater 50 as explained by the following. A better understanding of this relationship may be had by reference to FIG. 4, which shows in chart form the successive time intervals in which samples are taken. It will be recalled that there are 833 range intervals of interest in the present example. These are represented by the 833 columns in FIG. 4, one column for each range interval. Further, for each range interval spacing on the drum 51, there may be available n (here 22) parallel product signal representations of the echo pulses. These are represented by the 22 drum channels. During each cycle of rotation of the drum 51, therefore, the sampling gates 55 are opened to pass pulses therethrough only once every twenty-second range interval. In this manner all of the product signal representations from a given target that are present on drum 51, target A, for example, pass through the sampling gates 55 at essentially the same time. During the first cycle of rotation of the drum 51, for example, the sampling gates 55 may be opened only during the first, 23rd, 45th, etc. range intervals. During the next succeeding cycle of rotation of the drum 51, the output signals provided by the reproducing heads are sampled one range interval later, as during the 2nd, 24th, 46th, etc. intervals. This progression continues until 22 revolutions of the drum have been completed, during which each of the range intervals will have been sampled once, which is sufficient to derive information as to the appearance of a target at some range interval during that time.

A number of different expedients may be used for generation of the gate signals for operating the gates 55. The second pulse repeater 50 may, for example, include a clock track and associated transducers (not shown) which provide timing reference signals for each cycle and for each range interval spacing. The timing reference signals may be used to control a counter and logical gating circuits (also not shown) to provide sampling signals at the specific desired times in each of the cycles of the drum. With such an arrangement, the second pulse repeater 50 could also provide the timing reference for initiating transmitted pulses. It should be understood that the means for generating the different sampling signals can assume any of many different forms well known in digital control and switching applications, and that such means are indicated generally as being provided by the synchronizer 12.

The output signals provided from the sampling gates 55 remain in parallel, but are applied to delay circuits 60 which introduce time displacements sufficient to place the representations of the echo pulses derived from a single target into a serially contiguous time displaced form. The differential delays introduced by the delay circuits are equal to the duration ($\tau$) of the transmitted pulses.

In a first of the channels from the sampling gates 55, no delay element is used and a conductor 61 provides a direct output through the delay circuit 60. The signals provided by the conductor 61 are those occurring first, in point of time, as a result of the successive shifting actions in the second pulse repeater 50. In the next succeeding channel, however, a delay element 62 is employed to provide a delay $\tau$, where $\tau$ is equal to the selected pulse duration. The succeeding channels provide successively longer delays differing only by the value $\tau$ from the preceding channel until a final delay element 63 is reached which provides a delay of $(n-1)\tau$ ($21\tau$ in the example).

Thus, as shown in the graph of FIG. 5, the signals which are concurrently passed through the sampling gates 55 in the different channels are shifted into a serial time relation by the delay circuits 60 in which each of the signals in the different channels is adjacent in time to the signals occurring in the closest channels thereto. All of the signals from the delay circuits 60 are coupled together in an adder circuit 64 to complete the conversion of a substantially continuous serial pulse train of n signals from a single distant target.

A bank of Doppler filters 66 is arranged to receive the signals from the adder circuit 64. Each of the Doppler filters is a bandpass filter, selected to accept a band of frequencies extending over a selected range, and to reject those frequencies falling outside the range. Bandpass limits for the Doppler filters are selected such that a continuous range is encompassed by the totality of the Doppler filters. The output terminal of each of the filters is coupled to a Doppler filter selector 68 which is arranged to provide an output signal whenever any one of the Doppler filters passes a signal thereto. A number of circuits are available for providing this function, and accordingly the Doppler filter selector 68 has not been illustrated in detail. It may consist, however, of a high speed electronic scanning system for repeatedly and successively sensing or sampling the output of the Doppler filters 66. Alternatively, each of the Doppler filters may be coupled, within the Doppler filter selector 68, to an amplifying device which is biased beyond cut-off to a suitable level corresponding to a threshold value substantially equal to the maximum probable noise signal. The presence of a signal at the output terminal of any one of the Doppler filters 66 then will drive the amplifying device to a conducting state, and a voltage will be produced at the output of the Doppler filter selector 68.

Output indication circuits 70 are coupled to utilize the information derived from the Doppler filter selector 68, the synchronizer 12, and the scan control mechanism 15 to provide range and direction information relative to the different targets which are to be determined. Output signals from the Doppler filter selector 68 and signals from the synchronizer 12 are applied to a range data processor 71 to indicate the presence of targets at a selected range or ranges in a given direction. Returning briefly to the operation previously discussed, it should be noted that the synchronizer 12 operates sampling gates 55 in a predetermined and known sequence, so that when an output signal is provided from the Doppler filter selector 68, it is provided at a known time following the operation of the sampling gates 55. Therefore, within the range data processor 71 the presence of a signal at the output terminal of the Doppler filter selector 68 may be used together with the information derived from the synchronizer 12 to identify the range of the target.

In like fashion, the position of the scan control mechanism 15 is related in a definite way to the time of occurrence of an output signal at the Doppler filter selector 68, and signals representative of these conditions are applied to a direction data processor 72. The range data processor 71 and direction data processor 72 may be digital or analog simulation or computing devices operating in accordance with a predetermined program to convert the basic data into information suitable for range and direction indications. A display device 74, which may be a cathode ray device or another form of two-dimensional visual display or a recording device, receives the information from the range data processor 71 and direction data processor 72 and provides the desired indication.

To summarize, it will be seen that the system shown in FIG. 1 operates continually, with the selected scanning sequence, to ascertain echo signals despite the concurrent existence of high ambient noise levels or jamming signals, and also to separate targets which are at different ranges from each other. Under control of the synchronizer 12, the transmitter 10 generates the high power transmitter pulses which are applied through the T-R circuit 13 to the antenna 14 as it is mechanically operated by the scan control mechanism 15. As stated before, in the interpulse period following each transmitted pulse, the echo pulses derived because of reflections from targets within the relatively narrow beam angle of the antenna 14 are returned back through the T-R circuit 13 to the preamplifier 17 and the associated processing circuits. A facsimile of the transmitted pulses is coupled off into a parallel channel to the received echo pulses. These pulses are then passed to a mixer 18 or 23, where they are heterodyned to a lower frequency determined by the frequency provided by the local oscillator 22. After suitable filtering and IF amplification, the IF signals are recorded in the first pulse repeater 30.

The IF signal representations of the echo pulses are recorded by a recording head 33 in a signal channel on the drum 31 of the first pulse repeater 30, but each facsimile of a transmitted pulse provided from the amplifier 26 is recorded in parallel at a number of points on the drum 31. As pointed out above, the points are disposed in the separate channels and arrayed in staggered fashion relative to the channels, so that a facsimile of the transmitted pulse is present for each range interval of interest in the system. Although IF is used for the recording patterns, it is proper to speak of "facsimiles" of the transmitted pulses because frequency, phase, and duration information is retained.

In the first pulse repeater 30, therefore, the facsimiles of the transmitted pulse which are recorded are thereafter reproduced by the reproducing heads 35 in such fashion as to form the continuous train of facsimiles. At some time during the reproduction of this train of pulses, a representation of echo pulse may be recorded in the echo pulse channel of the drum 31. Thereafter, the echo pulse representation is reproduced concurrently with that one of the facsimiles of the transmitted pulse which corresponds to the range interval of that particular target. The facsimiles of the transmitted pulse are combined at a single output terminal by the adder circuit 40 and multiplied by the reproduced representation of the echo pulse in the multiplier circuit 41.

At this point, certain facts should be noted about the product signal which is derived from the multiplier circuit 41. Because of the range of the target which caused the echo pulse, there is a phase shift between the signals applied to the multiplier circuit 41. The product signal derived from the multiplier circuit 41 varies in amplitude in accordance with this phase shift, which may be considered to be a short term component of a Doppler frequency shift because successive echo pulses are received at slightly varying ranges. The individual product signals for the different echoes from different targets are of extremely short duration because they correspond substantially to the 3-microsecond pulse duration of the transmitted pulses. Therefore, an individual product signal pulse derived from the multiplier circuit 41 represents in amplitude only the relative phase shift and does not by itself identify the Doppler frequency.

The product signal from the multiplier circuit 41 is thus in the form of a continuously varying signal which at times represents the product of a facsimile of the transmitted pulse and noise, at other times is substantially zero, and at other times, when responding to the presence of an echo pulse, is in the form of a pulse having an amplitude determined by the phase difference between the transmitted pulse facsimile and the echo pulse representation.

These amplitude varying pulses, derived as product signals corresponding to echo pulses from a given target, are then recorded in parallel in the second pulse repeater 50, as shown in FIG. 3. Because the periodicity of the drum 51 and the relative spacing between the recording and reproducing heads in the successive channels is such as to shift product signals derived from the echo pulses returned from an individual target along a given line on the drum 51, there may be considered to be both spatial and time parallelism between these signals.

Each time the drum 51 makes another revolution, the parallel signals at each of the range interval positions around the drum pass the reproducing heads 53 and are applied to the coupled input terminals of the individual sampling gates 55. The sampling gates 55 are, however, opened only during selected intervals which are separated by a time equal to $n\tau$, to allow a spacing sufficient for further rearrangement of the signals. This spaced sampling occurs on each succeeding revolution of the drum 51 at different range intervals until all of the different range intervals of the drum 51 have been sampled at least once during $n$ revolutions of the drum 51.

The product signal representations which are passed through the sampling gates 55 are then arranged into a serial and continuous form to represent the Doppler frequency components which are to be analyzed. The envelope defined by the different amplitude varying pulses is, however, time-compressed by elimination of the interpulse spacing. As shown at (A) in FIG. 6, the different product signal representations of the echo signals from a given target are initially, after the first pulse repeater 30, separated by the interpulse period. Subsequent to passage through the delay circuit 60 and the adder circuit 64 to be combined at a single terminal, these pulses are rearranged into an essentially continuous sequence, as shown at (B) in FIG. 6. Each of the pulses represents a different amount of phase shift, but taken together the pulses redefine, at a higher frequency, the envelope of the Doppler frequency which is introduced into the echo pulses due to the relative movement of a target.

The time compression of the Doppler frequency is due to the elimination of the interpulse period between the successive echoes. The extent of the frequency compression is determined by the duty cycle of the system (1/833) and results in a multiplication of the frequency by a factor of 833 in this instance. The Doppler filters 66 are arranged to have an overall frequency band essentially equal to half the pulse repetition frequency employed after taking into account the time compression which is introduced. The various harmonics of the product of the Doppler frequency and the pulse repetition frequency provide a wide range of frequency components. Due to the "folding over" of the higher harmonics of difference frequencies, some frequency appropriate for excitation of the Doppler filters 66 is present within each band embracing half the lower of the two applied frequencies (here the pulse repetition frequency). To use this minimum bandwidth, however, one limit of the range covered by the filters 66 must fall on a multiple of the pulse repetition frequency. If the bandwidth of the filters 66 is made equal to the pulse repetition frequency, the placement of the limits of the frequency band is not critical. Without time compression, filters of approximately 50 cycles per second (c.p.s.) bandwidth may be employed, such filters being readily available and providing adequate signal-to-noise ratios. Due to the frequency compression, the bandwidth of each filter would be increased by a factor of 833, or to approximately 42 kc. When any one of the Doppler filters 66 is excited, the Doppler filter selector 68 provides an output signal to the range data processor 71 and the direction data processor 72. These data processors 71 and 72 utilize the timing information derived from the synchronizer 12 and the scan control mechanism 15 to provide range and direction data for controlling the display device 74.

A principal factor of interest is whether sufficient excitation time is available at the filters 66 for a useful output to be provided to the Doppler filter selector 68. It is an important aspect of the present invention that the serial rearrangement of the echo pulses which is provided affords sufficient buildup time to excite readily available filters. In the system which is used in the present example, the number ($n$) of pulses on target during a radar scan is equal to 22. With a 2.5 millisecond (ms.) interpulse period, pulse signals are available for each target over an approximately 55 ms. interval.

It may be readily shown that the application of pulses over a 55 ms. interval is equivalent in a power sense to an even distribution of lower amplitude signals over the 55 ms. interval. Therefore, the 55 ms. interval may be considered to be the buildup time available for exciting the filters, if the time compression is not considered. With 50 c.p.s. bandpass filters, for example, a buildup time of 1/50, equal to 0.02 second, is essentially the minimum required. With 55 ms. available, the desired excitation of the filter could be provided with only 8 pulses instead of the 22 used in the example. When taking account of the fact that the time available is reduced by the time compression, it should also be noted that the corresponding increase in the bandpass of the filters diminishes the buildup time which is needed by an equivalent factor. The time compression is proportional to a factor equal to the reciprocal of the duty cycle (833) and the bandpass of the filters is increased by a corresponding factor to approximately 42 kc.

The sampling of the groupings of product signals stored in the second pulse repeater 50 provides a sufficient excitation of the Doppler filters 66 in all cases, despite the essentially random relation of the sampling times to target position. Ideally, of course, samples would be taken immediately after $n$ product signals, corresponding to the successive echoes derived from a given target as the beam scanned across it, had completely filled one range interval in the second pulse repeater 50. The presence of less product signals, but still eight or more, would still (as shown above) properly excite the filters 66. If the sample were taken with less than eight product signals available, the excitation available would not, with that sample, be sufficient. At the next sampling of the same range interval, however ($n$ cycles of the drum later), the target would have been more fully scanned by the beam, and at least fourteen product signals would be available.

Another aspect of the present invention relates to the manner in which phase information concerning a transmitted pulse is retained by providing a continuous sequence of facsimiles of a transmitted pulse, each of which is precisely related in frequency to the frequency of the transmitted pulse. Phase information is not lost due to slight frequency shifts in the power oscillator of the transmitter. A result is that the system operates, in effect, as a coherent system as to the signal-to-noise ratio. The product signal which is obtained and subsequently processed makes possible this improvement, due to the fact that the phase relation of the transmitted pulses is retained for subsequent comparison to the echo pulses. Systems in accordance with the invention therefore markedly increase the capability of an existing, non-coherent radar to distinguish echoes despite the concurrent presence of high ambient noise levels or deliberately created noise. This means also that echoes returning from targets at extremely long ranges may be detected, effectively increasing the range of the system. Systems provided in accordance with these concepts have increased the range capability of a non-coherent radar by several times.

Another aspect of the present invention is that radars may be constructed employing signal analyzing systems in accordance with the present invention as an integral part, or as an added feature which does not disturb the normal functioning of the pre-existing parts of the system. This means that existing equipment need not be modified to any material extent to provide increased capabilities.

Particular advantages are derived in search radars, in which signals from a great many targets may have to be processed. Even though the echo pulses derived from different targets are interleaved with respect to each other, and even though a jamming source may be present, the system operates to identify each target as to range and direction without ambiguity.

Yet another aspect of the invention relates to the conversion, with time compression, of the information which is being analyzed. It has heretofore been particularly difficult to rearrange signals which occur periodically from the same source but where there are no fixed time relationships between signals from different sources so as to place all signals from an individual source together for further processing. The product signals derived from the multiplier circuit 41 and applied to the signal pulse repeater 50 are samples of signals of this nature. These signals might also be derived at a process computer from a number of sensing means, each of which provides a periodic signal essentially independently of the other sensing means. The serial to serial time-compressed conversion effected by the present system is particularly compact in form and operates without requiring external control of the timing function. While particular advantages are derived from the redefinition of the Doppler frequency in time-compressed form, as previously indicated, the conversion is not limited to this operational environment. In addition to data processing, this rearrangement of the signals may also be employed in a communication system in which data is quantized into multiple pulses which are subsequently recombined.

While there have been described improved detection and ranging systems and signal analyzing systems, it will be appreciated that other modifications and variations may be employed within the concept of the invention. Accordingly, the invention should be considered to include all modifications and alternative forms falling within the scope of the appended claims.

What is claimed is:

1. A search radar system comprising:
 a generator of radio frequency pulses of selected duration and of selected interpulse spacing;
 means, including a scanning antenna, for directing the radio frequency pulses in a scanning pattern and deriving phase shifted individual echo pulses from reflecting objects;
 first delay means responsive to the radio frequency pulses for providing, for each pulse, a continuous sequence of facsimile representations thereof extending over a selected interval;
 multiplying means for multiplying together the facsimile representations and representations of the echo pulses to provide product signals having amplitudes determined by the phase shift introduced into the individual echo pulses;
 means responsive to the product signals for shifting product signal representations derived from successive echo pulses returned from individual targets into time-parallel groups;
 gating means coupled to the means for shifting product signal representations for simultaneously gating out the indvidual representations of a group;
 means coupled to receive the groups and to provide serial pulse trains therefrom having frequency components determined by the relative movement of the reflecting object; and
 means responsive to the frequency components of the serial pulse trains, the gating means, and the scanning antenna for indicating the range and direction of the reflecting objects.

2. A search radar system comprising:
 a generator of transmitter pulses of selected duration and of selected interpulse spacing;
 means, including an antenna, for directing the transmitter pulses in a scanning pattern and deriving phase shifted echo pulses from reflecting objects, the phase shift of each echo pulse depending upon the instantaneous range of a reflecting object, there being a number of echoes from each object;
 first delay means responsive to the transmitter pulses for providing, for each pulse, facsimile representations thereof in a continuous sequence extending over a selected interval corresponding to the maximum expected return time for echo pulses from a given transmitter pulse;
 multiplying means for multiplying together representations of echo pulses and the facsimile representations of the originating transmitter pulse to provide product signals;
 means for delaying the product signals by successive intervals substantially equal to the interpulse spacing to provide concurrently available representations of the product signals arising from the successive echoes from a given reflecting object;
 means for successively gating the representations of the product signals at successive timed intervals subsequent to the generation of a transmitter pulse; and
 means for detecting the occurrence of selected frequency components in the representations of the product signals.

3. A search radar system comprising:
 a generator of microwave pulses, each of which has a selected duration and a selected interpulse spacing from the adjacent pulses;
 a transmit-receive system including a scanning antenna having a predetermined scan cycle for directing the microwave pulses in a scanning pattern and deriving phase shifted echo pulses from reflected objects, the phase shift being determined by the instantaneous range of the reflecting object, there being successive echoes from each object due to successive microwave pulses directed thereagainst;
 a multiple pulse generator responsive to the microwave pulses and providing, for each microwave pulse, facsimile representations thereof in a continuous sequence extending over a selected interval which is at least as great as the maximum expected return time for echo pulses originating with a given microwave pulse;
 multiplying means for multiplying together the representations of echo pulses and the facsimile representations of the original microwave pulse therefor to provide product signals having amplitudes determined by the phase shift introduced into the echo pulses;
 multi-channel recording means responsive to the product signals and including an input channel, output couplings for each channel and intercouplings between successive channels for shifting product signal representations along the channels from the input channel in synchronism with the interpulse spacing;
 gating means coupled to the output couplings of the multi-channel recording means for successively gating signals therefrom to define successive range intervals following the origination of a microwave pulse;
 means responsive to the gated signals for successively time-shifting the signals from the different channels into a continuous, time-compressed series;
 frequency selective filter means responsive to the time-compressed series for detecting the occurrence of selected frequency components therein; and
 output indication means responsive to the position of the scanning antenna, the frequency components detected by the frequency selective filter means, and the operation of the gating means for providing information as to the direction and range of individual reflecting objects from, respectively, the position of the scanning antenna and the range interval in which the gated signals are provided.

4. A system for operation with a search radar to utilize pulses of oscillatory waves transmitted with a selected pulse duration and pulse repetition frequency from the radar, and echo pulses from distant moving objects to determine the distance and direction of the objects despite the concurrent reception of interfering signals, comprising:
 first delay means responsive to the transmitted pulses for providing a continuous sequence of facsimile representations of each transmitted pulse for a selected interval;
 multiplying means for multiplying signal representations of the individual echo pulses with the sequence of facsimile representations of the corresponding transmitted pulses to provide individual product signals in the form of pulses having amplitude variations determined by the phase shift introduced by the range of the distant moving object;
 second delay means responsive to the product signals for simultaneously providing delayed representations of different product signals arising due to successive echo pulses following successive transmitted pulses, which echo pulses arise from a common distant object;
 means for sequentially gating the delayed representations from the second delay means; and
 means including frequency-sensitive filter means responsive to the delayed representations for deriving information as to distant moving objects from the successive phase shifts introduced into the echo pulses.

5. A system for operation with a search radar to utilize pulses of oscillatory waves transmitted with a selected pulse duration and pulse repetition frequency from the radar, and echo pulses from distant moving objects to determine the distance and direction of the objects despite the concurrent reception of interfering signals, comprising:

a first delay means responsive to the transmitted pulses for providing a continuous sequence of facsimile representations of each transmitted pulse for a selected interval following the transmitted pulse;

multiplying means for multiplying the signal representations of the individual echo pulses with the sequence of facsimile representations of the corresponding transmitted pulses to provide individual product signals in the form of pulses having amplitude variations determined by the phase shift introduced into the echo pulses due to the range of the distant moving object;

second delay means responsive to the product signals for concurrently providing delayed representations of the different product signals which are derived from the successive echo pulses provided from a given distant object upon direction of transmitted pulses toward that object;

means for sequentially gating the delayed representations from the second delay means, the times of gating corresponding to different range intervals for distant objects;

means coupled to the sequential gating means for converting the concurrently provided representations of product signals to a time-spaced series;

frequency-selective filter means responsive to the time-spaced series for detecting the occurrence of particular frequency components in the series representations of the product signals; and output indication means responsive to the frequency components detected by the frequency-selective filter means, and responsive to the sequential gating means for deriving range information concerning the distant moving objects despite the concurrent reception of interfering signals.

6. A pulse echo type radar system comprising:

a transmitter providing transmitted pulses at a predetermined repetition rate;

a first pulse repeating device responsive to each transmitted pulse for providing a train of contiguous pulses each of which corresponds to the transmitted pulse;

a receiver responsive to echo pulses derived from a target;

multiplying means responsive to the contiguous pulse train and any echo pulses derived by the receiver, the multiplying means being of the type providing an output signal only when input signals from the receiver are present;

a second pulse repeating device responsive to any output signal from the multiplying means for providing simultaneously a plurality of output signals, with each output signal of the plurality representing a different multiplying means output signal, the different multiplying means output signals being spaced in time by amounts equal to the delay between successive transmitted pulses;

sampling means coupled to the output terminals of the second pulse repeating device and including delay means for providing a plurality of consecutive adjacent pulses representative of echo pulses following successive transmitted pulses which occur with discrete and predetermined time intervals following the transmitted pulses; and indicator means responsive to any output of the sampling means for providing an indication of the presence of the target and including means synchronized with the sampling means for providing an indication of the distance range of the target.

7. A pulse echo type radar system comprising:

a transmitter providing transmitted pulses at a predetermined repetition rate;

a first pulse repeating device responsive to each transmitted pulse for providing, for each transmitted pulse, a train of contiguous pulses, each of which corresponds in phase and frequency to the transmitted pulse and is in a fixed time relation thereto, the train being essentially continuous and having a predetermined duration which at least equals the maximum expected return time for echo pulses;

means responsive to echo pulses derived from a target;

multiplying means responsive to the contiguous pulse trains and echo pulses;

a second pulse repeating device responsive to any product signals provided from the multiplying means for providing a plurality of product signals simultaneously, each of the product signals of the plurality representing a different product signal from the multiplying means taken at successive spaced points in time which are spaced apart an amount substantially equal to the delay between transmitted pulses;

delay means coupled to the output terminals of the second pulse repeating device for providing a serially time-displaced signal output of continuous form as a function of the product signals from the multiplying means which correspond to the echo representations which are derived from an individual target in response to a plurality of consecutive transmitted pulses;

sampling means coupling the output terminals of the second pulse repeating device to the delay means for passing the product signals provided simultaneously from the second pulse repeating device which are provided at successively greater intervals following a transmitted pulse; and indicator means responsive to any product signals provided from the delay means for providing an indication of the presence of the target and responsive to the operation of the sampling means for providing an indication of the distance range of the target whose presence is indicated.

8. A pulse echo type radar system comprising:

a transmitter providing transmitted pulses at a predetermined repetition rate;

means responsive to the transmitted pulses for forming a continuous pulse train for each transmitted pulse;

receiver means responsive to echo pulses derived from a target;

multiplying means responsive to the echo pulse representations derived by the receiver means and to the continuous pulse trains for providing product signals representative of different echo pulses;

means for simultaneously reproducing the product signals which represent the echoes derived from a selected target for successive ones of the transmitted pulses;

means for successively sampling the simultaneously reproduced product signals at spaced time intervals, each time interval denoting a different range to a target;

means responsive to the simultaneously reproduced sampled signals for providing a plurality of consecutive adjacent pulses; and means responsive to the consecutive adjacent pulses and coupled to the sampling means for providing indications of the presence and range of a target.

9. A radar system comprising:

means providing transmitted pulses at a predetermined repetition rate and deriving echo pulses from reflecting objects;

means responsive to the transmitted pulses for forming a continuous train of facsimiles of each transmitted pulse;

means for multiplying echo pulses against the facsimiles of the transmitted pulses which originated the echo pulses to provide product signals;

means for rearranging the product signals to provide simultaneously the product signals derived from a given reflecting object; and means for sensing changes occurring in the phase of the echo pulses from a given reflecting object relative to the transmitted pulses by sensing variations in the product signals derived from a given reflecting object.

10. A system for determining the range and direction of distant objects comprising:

means providing transmitted pulses at a predetermined repetition rate and deriving echo pulses from distant reflecting objects;

means responsive to the transmitted pulses for providing a train of facsimiles of each transmitted pulse, which train is continuous but of no greater duration than the interval between transmitted pulses;

multiplying means responsive to the facsimiles and the echo pulses for multiplying each echo pulse by the facsimiles of the originating transmitted pulse to provide individual product signals whose amplitude is dependent upon the instantaneous range of the reflecting objects;

means responsive to the product signals for providing a continuous serial train of product signals for each reflecting object; and frequency-sensitive filter means responsive to the continuous train of product signals from the reflecting objects for detecting the occurrence of the echo pulses from the reflecting objects.

11. For a radar system providing transmitted pulses and receiving echo pulses, a system for providing coherent identification of the received echo pulses, including the combination of:

recording means coupled to record representations of the transmitted pulses and echo pulses, the recording means being arranged to provide a substantially continuous train of facsimiles of each transmitted pulse;

multiplying means coupled to the recording means for multiplying the representation of an echo pulse by a facsimile of the related transmitted pulse to provide a product signal;

means responsive to the multiplying means for placing the product signals corresponding to echo pulses returned from a common object in a continuous serial train; and means responsive to the frequency components of the serial train for indicating the occurrence of the echo pulses from the common object.

12. For a radar system providing transmitted pulses and receiving echo pulses, a system for providing the equivalent of coherent operation to identify received echo pulses, including the combination of:

recording means coupled to record representations of the transmitted pulses and the echo pulses, the recording means being arranged to provide a substantially continuous train of facsimiles of each transmitted pulse;

multiplying means coupled to the recording means for multiplying the representation of an echo pulse by a facsimile of the related transmitted pulse to provide a product signal;

means responsive to the multiplying means for rearranging the product signals corresponding to echo pulses returned from a common object into time parallelism;

means for gating out the time parallel product signals at spaced intervals in a sequence which samples each of the time parallel groupings at least once;

means coupled to the gating means for shifting the time parallel product signals into a continuous serial train extending over the spaced interval; and means responsive to frequency components of the serial train for indicating the occurrence of echo pulses from a common object.

13. A system for deriving information from serial pulses having selected durations and selected interpulse spacings, including the combination of:

means responsive to the serial pulses for providing time-parallel pulses therefrom; and means coupled to receive the time-parallel pulses for providing a serial pulse train in which the individual pulses are adjacent.

14. A system for deriving information from serial pulses each having a selected duration and a random time relation to a known time cycle, successive pulses which have like time relations to successive ones of the time cycles being so related as to provide information concerning source, the system including the combination of:

means responsive to the serial pulses for converting the successive pulses having like time relations to the successive time cycles into a time-parallel relationship;

means for gating out the pulses in time-parallel relationship together; and means for successively delaying individual ones of the time-parallel pulses by progressively greater amounts to derive a serial pulse train in which the individual pulses are contiguous.

15. A system for converting amplitude modulated signals derived from separate sources into modified, time-compressed signals, the amplitude modulated signals from each source occurring with a known periodicity, but the signals derived from the different sources being substantially unrelated in time, the system including the combination of:

means responsive to the amplitude modulated signals for rearranging the signals from an individual source into time parallelism; and means coupled to receive the rearranged signals and to shift the signals from parallelism into a continuous signal train.

16. A system for converting amplitude modulated signals derived from separate sources into time-compressed signals containing distinguishable frequency components, the amplitude modulated signals from each source representing different phase relations in a periodically varying signal and occurring with a known periodicity, the system including the combination of:

means responsive to the amplitude modulated signals for rearranging the signals from each individual source into time parallelism;

means coupled to gate the rearranged signals at separate spaced intervals, such that the time-parallel signals from an individual source are provided simultaneously at a known time; and means coupled to receive the time-parallel signals and to shift the signals from parallelism into a continuous signal train in which the signals are adjacent and define an envelope containing distinguishing frequency components.

17. A system for converting $n$ amplitude modulated signals derived from separate sources into time-compressed signals containing distinguishable frequency components, the amplitude modulated signals from each source representing different and successive phase shifts of a periodically varying signal, the signals from each source occurring with a known periodicity but the signals derived from the different sources being substantially unrelated in time, the system including the combination of:

means responsive to the amplitude modulated signals for rearranging the $n$ signals from each individual source into time parallelism;

means coupled to gate the rearranged signals at spaced sampling intervals which are separated by $n$ like sampling intervals, thus to provide $n$ signals from the same source simultaneously; and means coupled to receive the simultaneously provided signals and to shift the signals into a substantially continuous sequence in which the individual signals are adjacent each other in time and the $n$ signals occupy the $n$ sampling intervals, thus to redefine in time-compressed form the envelope of the periodically varying signals provided from each of the separate sources.

References Cited in the file of this patent

UNITED STATES PATENTS

| | | |
|---|---|---|
| 2,779,428 | Silverman | Jan. 29, 1957 |
| 2,836,359 | Mazzagatti | May 27, 1958 |